June 23, 1970 R. ADELL 3,516,616

WHEELLESS TAPE CARTRIDGE

Filed Dec. 4, 1967

INVENTOR.
Robert Adell
BY
Harness, Dickey & Pierce
ATTORNEYS.

United States Patent Office 3,516,616
Patented June 23, 1970

3,516,616
WHEELLESS TAPE CARTRIDGE

Robert Adell, 1525 Ardmoor, Birmingham, Mich. 48010

Filed Dec. 4, 1967, Ser. No. 687,590
Int. Cl. B65h *17/48*
U.S. Cl. 242—55.19 1 Claim

ABSTRACT OF THE DISCLOSURE

A magnetic tape cartridge for use in automobile, home or other tape players comprising a cartridge top and bottom and a spool for holding wound magnetic tape thereon wherein the improvement lies in the utilization of a wheelless drive means contacted by the tape after it has left the sound head area of the cartridge enabling the tape to be driven through the cartridge during playing.

CROSS REFERENCE TO RELATED APPLICATIONS

Reference is here made to applicant's copending U.S. patent applications: Ser. No. 645,772, filed June 13, 1967, entitled "Stereo Tape Cartridge"; and Ser. No. 687,622, filed Dec. 4, 1967, entitled "Tape Cartridge."

BACKGROUND OF THE INVENTION

This invention broadly relates to tape cartridges. More specifically it is related to magnetic tape cartridges or stereo tape cartridges wherein the improvement is comprised of a wheelless drive means to facilitate movement of the tape through the cartridge during playing thereof.

It is conventional in the field of tape cartridge to use a rubber surfaced drive wheel against which the tape is brought into pressing contact after it has left the sound head area so that the tape may be driven through the cartridge. Movement of the tape over the rubber drive wheel is carried out by contacting the rubber wheel with an exterior drive member forming part of the tape player structure when the cartridge is inserted for playing and the exterior drive member (pressed against the rubber wheel with the tape in between) rotates the wheel and causes the tape to move through the cartridge. Conventionally the exterior drive member is an approximately quarter inch diameter steel wheel or like suitable means. The present invention is concerned with the discovery that a unique and highly satisfactory tape cartridge can be achieved through the use of a wheelless drive means within the tape cartridge which is disclosed hereinafter.

The object of the invention is to provide an improved tape cartridge.

Another object of the present invention is to provide an improved magnetic tape cartridge for use with tape players in automobiles, homes, etc., wherein the cartridge is economical to produce and assemble.

Another object of the present invention is to provide an improved tape cartridge wherein the tape is driven through the cartridge using a wheelless drive means.

Other objects, features and advantages of the present invention will become apparent from the subsequent description and the appended claims taken in conjunction with the accompanying drawings wherein like numerals denote like elements.

SUMMARY OF THE INVENTION

Broadly stated, this invention comprises a magnetic tape cartridge comprising: a cartridge top, a cartridge bottom, means for holding wound magnetic tape thereon, a sound head, tape guiding means essentially defined by said cartridge top and cartridge bottom cooperating with one another in assembled condition and operable to assist in unwinding and winding of the tape during playing of same, and stationary, low friction, wheelless drive means for contacting said tape which is in movement through the cartridge during playing of same and operable to allow driving movement of the tape.

DESCRIPTION OF THE PREFERRED EMBODIMENTS

While the following description related to the drawings illustrates a preferred form of the invention such description should be taken as illustrative only, with the invention being limited only by the appended claims.

Figure 2:
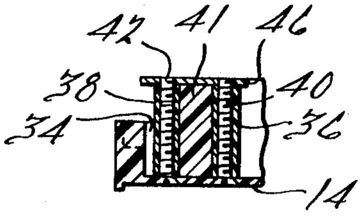
FIG. 2 shows a cross sectional view taken along the line 2—2 of FIG. 1.
Figure 1:
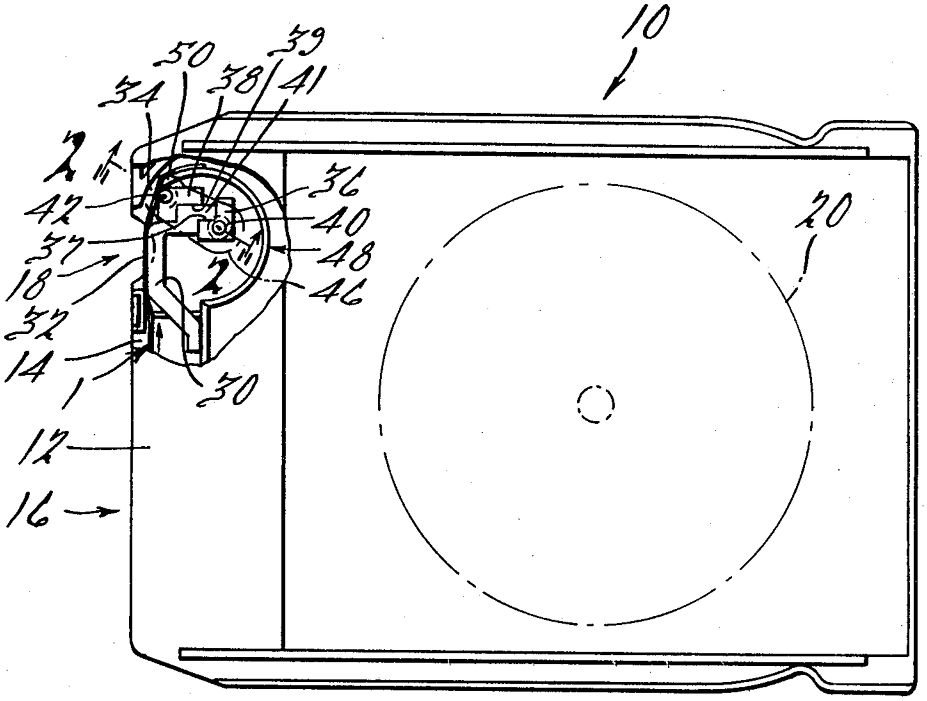
FIG. 1 is a top view of a tape cartridge with a partially cutaway section showing the utilization of a wheelless drive means which contacts the tape and enables the tape to be driven through the cartridge.

With reference to FIGS. 1 and 2 of the drawings, the tape cartridge 10 of this invention is comprised of the following parts which preferably are made from a plastic material: a cartridge top 12, a cartridge bottom 14, and a sound head or sound head pad area 16.

The wheelless drive means is generally designated 18 and is shown within the cutaway portion of FIG. 1, and by the cross sectional view of FIG. 2.

The cartridge 10 itself other than the drive means 18 may be of a construction such as disclosed in applicant's copending U.S. patent applications Ser. No. 645,772 filed June 13, 1967, entitled "Stereo Tape Cartridge," or application Ser. No. 687,622 filed Dec. 4, 1967 entitled "Tape Cartridge," with the disclosure of these applications being incorporated herein by reference in order to avoid excessive duplication. The tape cartridge utilizing the drive means 18 of this invention also may be of conventional constructions already known in the art. For example as mentioned, the tape cartridge would contain a cartridge top 12, a cartridge bottom 14, a sound head 16 and a means such as a spool 20 located at the central portion of the tape cartridge for holding the wound magnetic tape thereon.

The drive means 18 is wheelless and is comprised of a stationary, low friction, plastic member 30 in contrast to prior art tape cartridges wherein the function of driving the tape through the cartridge was carried out by a rubber wheel over which the tape was made to pass in pressing contact. The material for the plastic member may satisfactorily be any highly smooth, low friction plastic such as Teflon (Du Pont Co. trade name for polytetrafluoroethylene), Delrin (Du Pont Co. trade name for acetal resin polymer of formaldehyde), or nylon.

Operation of the wheelless drive means 18 is as follows. The tape 1 leaving the sound head area 16 is moved through the cartridge in a direction toward the drive means 18. An exterior cooperating wheel member (not shown) presses the tape against the flat surface 32 of the plastic member 30 and slidingly moves the tape across the flat surface 32 in an upward direction as shown in FIG. 1. After the tape has left the drive means 18 it passes through the channel 34 back into the cartridge for rewinding on the spool 20.

The supporting structure of the drive means 19, as shown in the drawings, is comprised of a first block member 36 and second block member 38. The block members 36 and 38 have L-shaped receiving surfaces 37 and 39 thereon, respectively, which hold a flange portion 41 of the plastic member 30 pressed therebetween such that the member 30 is held in upright position and stationary within the cartridge. As shown, the block members 36 and 38 are held fixed within the cartridge by screws 40 and 42 respectively, which are entered through the bottom of the cartridge and pass longitudinally up through bores within the block members 36 and 38. The screws 40 and 42 then pass through the upper end of the block members 36 and 38 and fasten into a positioning plate 46 which facilitates the action of the block members to hold the plastic member 30 pressed in stationary position therebetween.

As shown in FIG. 1, the drive means 18 is also generally surrounded on the right hand side by a rib guard 48. The rib guard 48 functions to prevent the tape from becoming fouled in the drive means after it has left the flat surface 32 and passed through the channel 34 back into the interior of the cartridge for rewinding on the spool 20. Furthermore, the exterior end 50 of the rib guard 48 functions to define one side of the channel 34 for guiding the tape immediately after it has left the drive means 18.

The plastic member 30 has a width at the flat surface 32 which is approximately equal to or greater than the width of the tape 1. The width being approximately equal to or greater than the width of the tape enables the flat surface 32 to provide a good low friction sliding support surface over which the tape moves when it is forced across the drive means by the exterior member with which the cartridge is contacted when it is inserted for playing.

What is claimed is:

1. A magnetic tape cartridge comprising:

a cartridge top, a cartridge bottom, means for holding wound magnetic tape thereon, a sound head, tape guiding means essentially defined by said cartridge top and cartridge bottom cooperating with one another in assembled condition and operable to assist in unwinding and winding of the tape during playing of same, and stationary, low friction, wheelless means for contacting said tape which is in movement through the cartridge during playing of same and operable to allow slipping movement of the tape through the cartridge, said wheelless means being positioned generally adjacent said sound head for driving contact with the tape just before it is rewound on the tape holding means, said wheelless means comprising a flat surfaced plastic member having a width approximately equal to or greater than the width of the tape, said plastic member including an L-shaped flange at one end thereof, a first block member and a second block member, each having formed thereon a receiving L-shaped surface, said first and second block members acting to support said flange member within the cartridge, and a rib guard means adjacent said wheelless means for preventing the tape from becoming fouled in the wheelless means after the tape has been passed over the wheelless means and prior to the time the tape is passed back into the interior of the cartridge for rewinding therein.

References Cited

UNITED STATES PATENTS

| | | | |
|---|---|---|---|
| 2,778,636 | 1/1957 | Eash | 242—55.19 |
| 2,876,005 | 3/1959 | Eash | 242—55.19 |
| 3,289,906 | 12/1966 | Schuller | 226—168 |
| 3,289,963 | 12/1966 | Taylor | 242—55.19 |
| 3,424,360 | 1/1969 | Trott | 226—168 |

RICHARD A. SCHACHER, Primary Examiner

U.S. Cl. X.R.

226—168, 196